United States Patent [19]

Karikawa et al.

[11] 4,258,995
[45] Mar. 31, 1981

[54] MIRROR OPERATING MECHANISM IN CASSETTE TYPE SLR CAMERA

[75] Inventors: Tohru Karikawa; Mituo Satoh, both of Tokyo, Japan

[73] Assignee: Asahi Kogaku Kogyo Kabushiki Kaisha, Tokyo, Japan

[21] Appl. No.: 60,540

[22] Filed: Jul. 25, 1979

[30] Foreign Application Priority Data

Sep. 5, 1978 [JP] Japan ................. 53-108966

[51] Int. Cl.³ .............................. G03B 19/12
[52] U.S. Cl. .................................... 354/153
[58] Field of Search ................ 354/152–153, 354/156, 158

[56] References Cited

U.S. PATENT DOCUMENTS

| 2,916,978 | 12/1959 | Harter et al. | 354/153 |
| 3,158,075 | 11/1964 | Ohara | 354/156 |
| 3,829,872 | 8/1974 | Ueda et al. | 354/156 |
| 3,906,527 | 9/1975 | Erlichman | 354/152 |

Primary Examiner—L. T. Hix
Assistant Examiner—Thomas H. Tarcza
Attorney, Agent, or Firm—Sughrue, Rothwell, Mion, Zinn and Macpeak

[57] ABSTRACT

A mirror operating mechanism in a single-lens reflex camera using a small film cassette. The mirror operating mechanism has a main plate having two guide shafts in parallel with the optical axis of the photographing lens of the camera and provided in the space between the picture opening and the film winding chamber of the film cassette. A mirror lifting drive plate and a mirror lowering drive plate are slidable along the two guide shafts, respectively. Driving coil springs are provided in parallel with the two guide shafts for driving said mirror lifting drive plate and mirror lowering drive plate, respectively.

10 Claims, 6 Drawing Figures

MIRROR OPERATING MECHANISM IN CASSETTE TYPE SLR CAMERA

BACKGROUND OF THE INVENTION

In the mirror operating mechanism of a conventional single-lens reflex camera, the mirror lifting drive lever and the mirror lowering drive lever are, in general, of the rotary lever type. It is necessary to provide a coil spring because driving the mirror needs a relatively great drive force. The lateral motion range of such a coil spring is large not only because it is stretched but also because the connection point thereof makes a circular motion. Accordingly, heretofore it has been difficult to provide a small mirror operating mechanism suitable for a camera using a small film cassette.

SUMMARY OF THE INVENTION

It is an object of this invention to provide an improved mirror operating mechanism for single lens reflex cameras using film cassettes.

It is another object of this invention to provide an improved operating mechanism for an SLR camera using 110 size film cassettes.

Yet further object of this invention is to provide a mirror operating mechanism that is reliable and does not require a large amount of space within the camera body.

In view of the foregoing, a small mirror operating mechanism has been provided according to the invention, in which a main plate having two guide shafts in parallel with the optical axis of the photographing lens is provided in the space between the picture operating and the film winding chamber of the film cassette. A mirror lifting drive plate and a mirror lowering drive plate are slidably provided on the guide shafts, respectively. Driving coil springs are provided in parallel with the guide shafts, respectively, so that the motion ranges of the driving coil springs are limited to their stretching motion ranges. This reduces the space necessary.

This invention will be described with reference to the according drawings and the description of the preferred embodiment that follows.

BRIEF DESCRIPTION OF THE DRAWINGS

FIG. 2 shows a state of the mirror operating mechanism obtained before the film is wound;

FIG. 3 shows a state of the mechanism obtained after the film is wound;

FIG. 4 shows a state of the mechanism obtained immediately after the release operation is effected;

FIG. 5 shows a state of the mechanism obtained immediately before the mirror is lifted and the shutter is operated, and FIG. 6 shows a state of the mechanism obtained immediately after the shutter operation is accomplished.

DESCRIPTION OF THE PREFERRED EMBODIMENT

Figure 1:
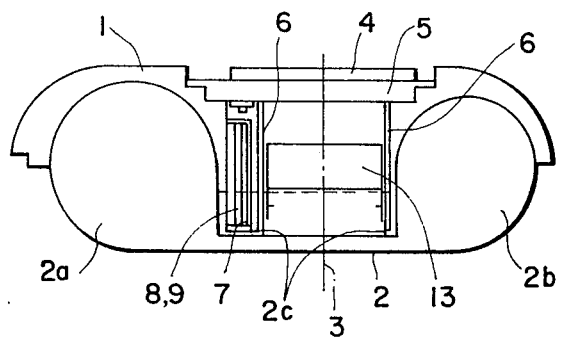
FIG. 1 is a sectional view of a camera for a description of the outline of this invention.

FIG. 1 is a plan view of a camera for a description of the outline of the invention. In FIG. 1, reference numeral 1 designates a camera body having therein a film cassette 2 divided into a film winding chamber 2a, a film supplying chamber 2b and a picture operating 2c. Line 3 is the optical axis of a photographing lens mounted in a lens mount 4. Other elements are a shutter 5, a mirror box 6 rotatably supporting a mirror; a main plate 7 supporting a mirror mechanism; and the guide shafts 8, 9 of a mirror lifting drive plate and a mirror lowering drive plate (described later), respectively. The guide shafts 8 and 9 are disposed on the main plate 7 in parallel with the optical axis 3 and a mirror 13. In general, a space is provided between the cassette opening 2c and the film winding chamber 2a. The main plate 7, and the guide shafts 8 and 9 are disposed in this space.

Figure 2:
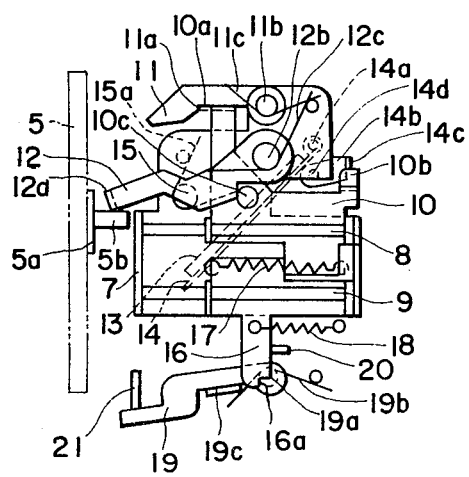
FIGS. 2 through 6 are side views showing a mirror operating mechanism according to the invention. More specifically.
Figure 3:
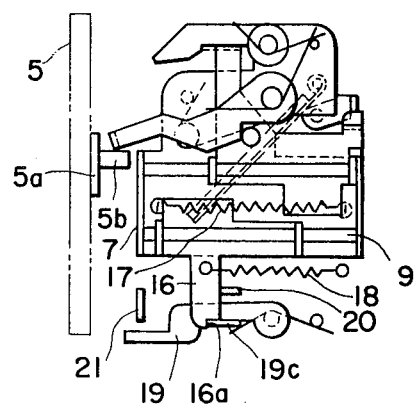
Figure 4:
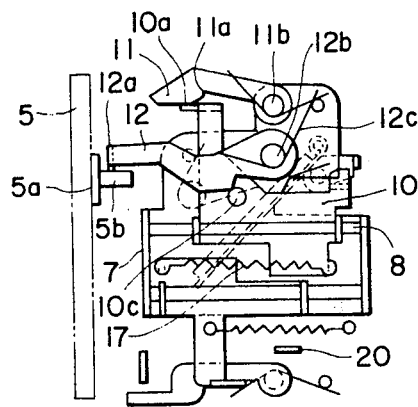
Figure 5:
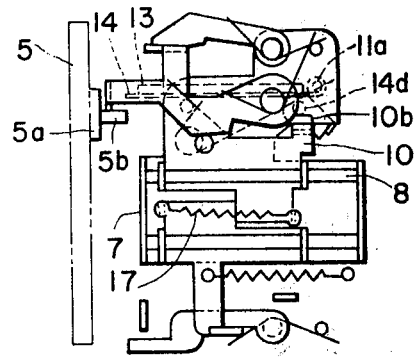
Figure 6:
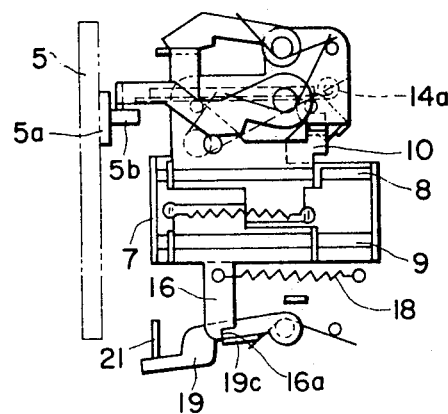

FIGS. 2 through 6 are side views showing a mirror operating mechanism. More specifically, FIG. 2 shows a state of the mirror operating mechanism obtained before the film is wound, FIG. 3 shows a state of the mechanism obtained after the film is wound, FIG. 4 shows a state of the mechanism obtained immediately after the shutter release operation is effectuated, FIG. 5 shows a state of the mechanism obtained immediately before the mirror is lifted and the shutter is operated, and FIG. 6 shows a state of the mechanism obtained immediately after the shutter operation is accomplished.

In FIG. 2, reference numeral 5 designates a shutter; 5a, a shutter blade drive plate and element 5b, a blade releasing pin fixedly secured to the drive plate 5a. The main plate 7 holds the mirror operating mechanism and the guide shafts 8, 9 are secured to the main plate 7 and extend in parallel with the optional axis. The mirror lifting drive plate 10 has a bent portion 10a, a protruded portion 10b and a drive pin 10c. A locking lever 11 is adapted to lock the mirror lifting drive plate 10 with the locking portion 11a adapted to lock the bent portion 10a. The lever has a pivot 11b and a restoring spring 11c.

A shutter release lever 12 is rotatable around a shaft 12b. The shutter release lever 12 has a bent end portion 12a which depresses the release pin 5b downwardly with the aid of a spring 12c. The mirror 13 is rotatable around a shaft 14a fixed to a mirror sheet 14. The rear end 14b of the mirror sheet has a bent portion 14c and a pin 14d which is depressed downwardly by a spring 15a engaged with a shaft 15 so that the mirror 13 is normally maintained at the viewing position.

Referring further to FIG. 2, reference numeral 16 designates the mirror lowering drive plate slidable along the guide shaft 9. The drive plate 16 has a step 16a, a coil spring 17 for driving the mirror lifting drive plate 10 to the left, and a coil spring 18 for driving the mirror lowering drive plate 16 to the right. A locking lever 19 has a bent portion 19c and is rotatable around a shaft 19a. The locking lever is forced to turn clockwise by a spring 19b. The bent portion 19c and the 16a are adapted to lock the mirror lowering drive plate 16. The end of the locking lever 19 confronts a lever 21 providing a shutter operation completion signal. A set lever 20, in association with the film winding operation, moves the mirror lowering drive plate 16 to the left to set the mirror operating mechanism, and is retracted after the completion of the winding operation.

The operation of the mirror operating mechanism according to the invention will now be described.

In cooperation with the film winding operation, the set lever 20 is moved to the left, while the mirror lowering drive plate 16 is slid along the guide shaft 9. As a result, the drive plate 16 is locked by its step 16a and the bent portion 19c of the locking lever 19. In this operation, both of the springs 17 and 18 are strained (FIGS. 2 and 3).

In association with the shutter release operation, the locking lever 11 is turned clockwise. Accordingly, the bent portion 10a is disengaged from the locking portion 11a, and the mirror lifting drive plate 10 is moved left by the elastic force of the spring 17. At the beginning of this operation, the pin 10c pushes up the shutter release lever 12 and accordingly the bent portion 12a against the elastic force of the spring 12c. The release pin 5b together with the blade drive plate 5a follows after the bent portion 12a with the aid of a spring incorporated in the shutter 5, to close the shutter blade (FIG. 4).

Since the mirror lifting drive plate 10 is moved to the left, the protrusion 10b pushes up the pin 14d connected to the rear end 14b of the mirror sheet and the mirror 13 is lifted together with the mirror sheet 14 (FIG. 5).

The shutter blade is opened by a mechanism (not shown) which is operated when the mirror is lifted, and it is then closed in a predetermined period of time. In this case, it is operated by a mechanism (not shown) which is actuated when the shutter operation has been completed, the lever 21 is moved downwardly, the locking lever 19 is turned counterclockwise, the bent portion 19c is disengaged from the step 16a, the mirror lowering drive plate 16 is moved to the right again by the spring 18, and the mirror lifting drive plate 10 is also moved right by the mirror lowering drive plate 16. At the beginning of the restoring movement (moving right) of the drive plate 10, the mirror is lowered. At the end of the restoring movement, the release lever 12 is lowered, i.e., restored, and the blade release pin 5b is depressed downwardly to release the blade. Thus, the mirror operating mechanism is restored as shown in FIG. 2.

As described above, the mirror lifting drive plate 10 and the mirror lowering drive plate 16 are slid along the guide shafts 8 and 9 in parallel with the optical axis, respectively, and the coil springs 17 and 18 are provided in parallel with the respective guide shafts and are operable in the expansion and contraction direction only. Therefore, the necessary space can be reduced, and the size of the mirror operating mechanism also can be decreased.

What is claimed is:

1. In a mirror operating mechanism in a single-lens reflex camera having a photographing lens with an optical axis perpendicular to film in a small film cassette, said cassette having film winding and storage chambers and a picture opening between said chambers, comprising; a main plate having two guide shafts parallel to the optical axis of the photographing lens of said camera, said main plate provided in the space between the picture opening and the film winding chamber of said film cassette; a mirror lifting drive plate slidable along one of said guide shafts and a mirror lowering drive plate slidable along the other of said two guides shafts; and first and second driving coil springs provided in parallel with said two guide shafts, said springs driving said mirror lifting drive plate and mirror lowering drive plate, respectively.

2. The mirror operating mechanism of claim 1 wherein said mirror lifting drive plate comprises a main body portion slidable on one of said guide shafts, a bent portion extending from said main body portion, a protruding portion and a drive pin.

3. The mirror operating mechanism of claims 1 or 2 wherein said mirror lowering drive plate comprises a main body portion and a step portion extending therefrom.

4. The mirror operating mechanism of claim 2 wherein said main body portion of said mirror lifting drive plate has a portion engagable with said mirror lowering drive plate.

5. The mirror operating mechanism of claim 2 further comprising locking means engagable with said bent portion.

6. The mirror operating mechanism of claim 5 wherein said locking means comprises a locking lever having a locking portion, a pivot and a bias spring disposed about said pivot.

7. The mirror operating mechanism of claims 1 or 2 further comprising a mirror and a mirror sheet holding said mirror.

8. The mirror operating mechanism of claim 7 wherein said mirror sheet has a bent portion, a pin and bias means disposed about said pin to retain said mirror in a lowered viewing position.

9. The mirror operating mechanism of claim 1 wherein said first spring is coupled to said mirror lifting drive plate and said mirror lowering drive plate.

10. The mirror operating mechanism of claims 1 or 9 wherein said second spring is coupled said mirror lowering drive plate.

* * * * *